US010831331B2

(12) United States Patent
Dunning et al.

(10) Patent No.: US 10,831,331 B2
(45) Date of Patent: Nov. 10, 2020

(54) WINDOW CONTROL FOR SIMULTANEOUSLY RUNNING APPLICATIONS

(71) Applicant: INTERNATIONAL BUSINESS MACHINES CORPORATION, Armonk, NY (US)

(72) Inventors: Jack Dunning, Lyndhurst (GB); Thomas Latham, Eastleigh (GB); Jordan Cain, Eastleigh (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 141 days.

(21) Appl. No.: 15/916,396

(22) Filed: Mar. 9, 2018

(65) Prior Publication Data

US 2019/0278431 A1 Sep. 12, 2019

(51) Int. Cl.
*G06F 3/0481* (2013.01)
*G06F 11/34* (2006.01)
(Continued)

(52) U.S. Cl.
CPC .......... *G06F 3/0481* (2013.01); *G06F 3/0483* (2013.01); *G06F 3/04842* (2013.01);
(Continued)

(58) Field of Classification Search
CPC ...... G06F 3/0481; G06F 17/24; G06F 17/211; G06F 3/0483; G06F 9/543;
(Continued)

(56) References Cited

U.S. PATENT DOCUMENTS 5,390,295 A * 2/1995 Bates .................... G06F 3/0481
714/E11.188
7,310,781 B2 12/2007 Chen et al.
(Continued)

OTHER PUBLICATIONS

Anonymous "Method for improving the usability of the Task Switcher (Alt-Tab function)", IP.com Disclosure No. IPCOM000196048D; published May 26, 2010; 5 pgs.
(Continued)

*Primary Examiner* — Matthew Ell
*Assistant Examiner* — Maria S Ayad
(74) *Attorney, Agent, or Firm* — Cantor Colburn LLP; Steven Chiu

(57) ABSTRACT

A computing device and computer automated method for controlling the display of application windows on a computer screen. A background process monitors a user's interaction with applications running on the computing device. The background process logs aspects of the user's interaction with applications, each application being associated with a window. The log is analyzed to detect the presence of a pattern in the user's interaction between any two applications, in particular repeated switching between two applications. If the pattern is detected, then the windows are reconfigured to present one of the windows as a picture-in-picture window within the other window. The automated switching to the picture-in-picture display of the two application windows ensures both windows are visible at the same time without the user having to reconfigure the windows manually.

13 Claims, 8 Drawing Sheets

(51) Int. Cl.

| | |
|---|---|
| *G06F 3/0484* | (2013.01) |
| *G06F 3/0483* | (2013.01) |
| *G06F 9/54* | (2006.01) |
| *G06F 9/451* | (2018.01) |
| *G06F 11/30* | (2006.01) |
| *G06Q 10/10* | (2012.01) |
| *G06Q 10/06* | (2012.01) |
| *G06F 40/103* | (2020.01) |
| *G06F 40/166* | (2020.01) |

(52) U.S. Cl.
CPC ............ *G06F 9/451* (2018.02); *G06F 9/543* (2013.01); *G06F 11/3003* (2013.01); *G06F 11/3438* (2013.01); *G06F 11/3476* (2013.01); *G06F 40/103* (2020.01); *G06F 40/166* (2020.01); *G06Q 10/06* (2013.01); *G06Q 10/10* (2013.01)

(58) Field of Classification Search
CPC .. G06F 11/3476; G06F 9/451; G06F 11/3003; G06F 11/3438; G06F 3/04842; G06F 40/103; G06F 40/166; G06F 2209/545; G06F 2203/04805; G06F 16/90; G06Q 10/10; G06Q 10/06; G06Q 10/06315
See application file for complete search history.

(56) References Cited

U.S. PATENT DOCUMENTS

| | | | |
|---|---|---|---|
| 7,346,855 B2 | 3/2008 | Hellyar et al. | |
| 7,703,116 B1* | 4/2010 | Moreau ................. | G06F 3/0482 725/45 |
| 8,126,924 B1* | 2/2012 | Herin ..................... | G06Q 10/06 707/791 |
| 8,245,154 B2 | 8/2012 | Karstens | |
| 8,689,125 B2 | 4/2014 | Chen et al. | |
| 8,930,840 B1* | 1/2015 | Risko .................... | G06F 3/0481 715/777 |
| 8,949,729 B2 | 2/2015 | Bastide et al. | |
| 9,158,443 B2 | 10/2015 | Brown et al. | |
| 2004/0201608 A1* | 10/2004 | Ma ..................... | H04N 21/4438 715/719 |
| 2006/0200842 A1* | 9/2006 | Chapman ............... | H04N 7/163 725/34 |
| 2007/0226642 A1 | 9/2007 | Soulier | |
| 2008/0005686 A1* | 1/2008 | Singh .................. | G06F 3/04842 715/764 |
| 2008/0058609 A1* | 3/2008 | Garibaldi ............... | G16H 40/63 600/300 |
| 2009/0187443 A1* | 7/2009 | Hart ....................... | G06Q 10/10 705/7.15 |
| 2010/0079671 A1* | 4/2010 | Vanduyn ............... | G06F 3/0481 348/565 |
| 2011/0249073 A1* | 10/2011 | Cranfill ................ | H04N 5/2258 348/14.02 |
| 2012/0296909 A1* | 11/2012 | Cao ..................... | G06F 16/9535 707/737 |
| 2013/0047182 A1* | 2/2013 | Gudlavenkatasiva ...................... H04N 21/466 725/38 |
| 2014/0053065 A1* | 2/2014 | Yun ..................... | G06F 16/9577 715/238 |
| 2014/0157168 A1* | 6/2014 | Albouyeh ............. | G06F 3/0484 715/770 |
| 2014/0195933 A1* | 7/2014 | Rao DV ............... | H04L 51/046 715/758 |
| 2014/0229992 A1* | 8/2014 | Ellis ..................... | H04N 21/458 725/47 |
| 2015/0365306 A1* | 12/2015 | Chaudhri .............. | G06F 3/0416 715/736 |
| 2015/0370620 A1 | 12/2015 | Lai et al. | |
| 2016/0349970 A1* | 12/2016 | Everitt ................. | G06F 17/212 |
| 2018/0365198 A1* | 12/2018 | Kim ..................... | G06F 17/212 |

OTHER PUBLICATIONS

NTWIND Software "Best Alt-Tab Alternative for Windows 10, Switch Tasks and Manage Windows Faster", retrieved from: http://www.ntwind.com/software/vistaswitcher.html; 2019; 4 pgs.

Youtube "VistaSwitcher, a Graphical Program Switcher" retrieved from: https://www.youtube.com/watch?v=Vq_hXtXaS4U; published Nov. 24, 2010; 2 pgs.

* cited by examiner

WINDOW CONTROL FOR SIMULTANEOUSLY RUNNING APPLICATIONS

BACKGROUND

The present disclosure relates to control of windows and associated graphical user interface features on the display of a computing device while two or more applications are running at the same time.

It is often the case that a user of a computing device, such as a personal computer, tablet computer or smart phone, will have two or more applications running simultaneously and is performing a repetitive task of pasting text, graphics objects, or other content information from one of the applications into another. The application from which it is being copied is termed the source application and the application into which it is being pasted is termed the destination application in the following. The source application is often a web browser or a standard office application. By standard office applications, we mean applications such as a word processor, presentation application, spreadsheet application or desktop publisher. The destination application is often a standard office application. For example, a user may be pasting text or images from a web browser into a word processor.

One existing approach to perform this task is to use a split-screen mode in which two application windows are open alongside each other so that they can be seen at the same time. Microsoft Windows (trademark) operating system has a "snap" feature that makes this easier. MacOS operating system (trademark) has a split view function that allows applications to split the monitor vertically and take space on either side. Splitting the screen is a manual process that takes the user time to arrange through suitable keyboard and mouse commands (for a conventional personal computer) or equivalent touch or pen gestures (for a tablet or smart phone).

BRIEF SUMMARY

According to one aspect of the disclosure, there is provided a computer automated method for controlling the display of application windows on a screen of a computing device. The method includes monitoring and recording in a log aspects of a user's interaction with first and second applications running on the computing device respectively associated with first and second windows presented on the screen. The method also includes analyzing the log to detect a pattern in the user's interaction with the first and second applications and reconfiguring the screen to present the second window within the first window as a picture-in-picture (PiP) window responsive to detecting the pattern.

According to another aspect of the disclosure, there is provided a computer program stored on a computer readable medium and loadable into the internal memory of a computing device, comprising software code portions, when said program is run on a computing device, for performing the above-defined method. A computer program product may also be provided which stores the above-mentioned computer program.

According to another aspect of the disclosure, there is provided a computing device having a computer program for running a background process, e.g. at operating system level that automatically controls display of application windows on a screen of the computing device. The computing device includes the screen; the computer program for the background process; a memory on which the computer program is loaded; and a processor for executing the computer program loaded in the memory so as to run the background process. The background process: monitors and records in a log aspects of a user's interaction with first and second applications running on the computing device respectively associated with first and second windows on the screen; analyzes the log to detect a pattern in the user's interaction with the first and second applications; and reconfigures the screen to present the second window within the first window as a picture-in-picture window responsive to detecting the pattern.

BRIEF DESCRIPTION OF THE DRAWINGS

In the following, the present invention will further be described by way of example only with reference to exemplary embodiments illustrated in the figures.

DETAILED DESCRIPTION

In the following detailed description, for purposes of explanation and not limitation, specific details are set forth in order to provide a better understanding of the present disclosure. It will be apparent to one skilled in the art that the present disclosure may be practiced in other embodiments that depart from these specific details.

Figure 1:
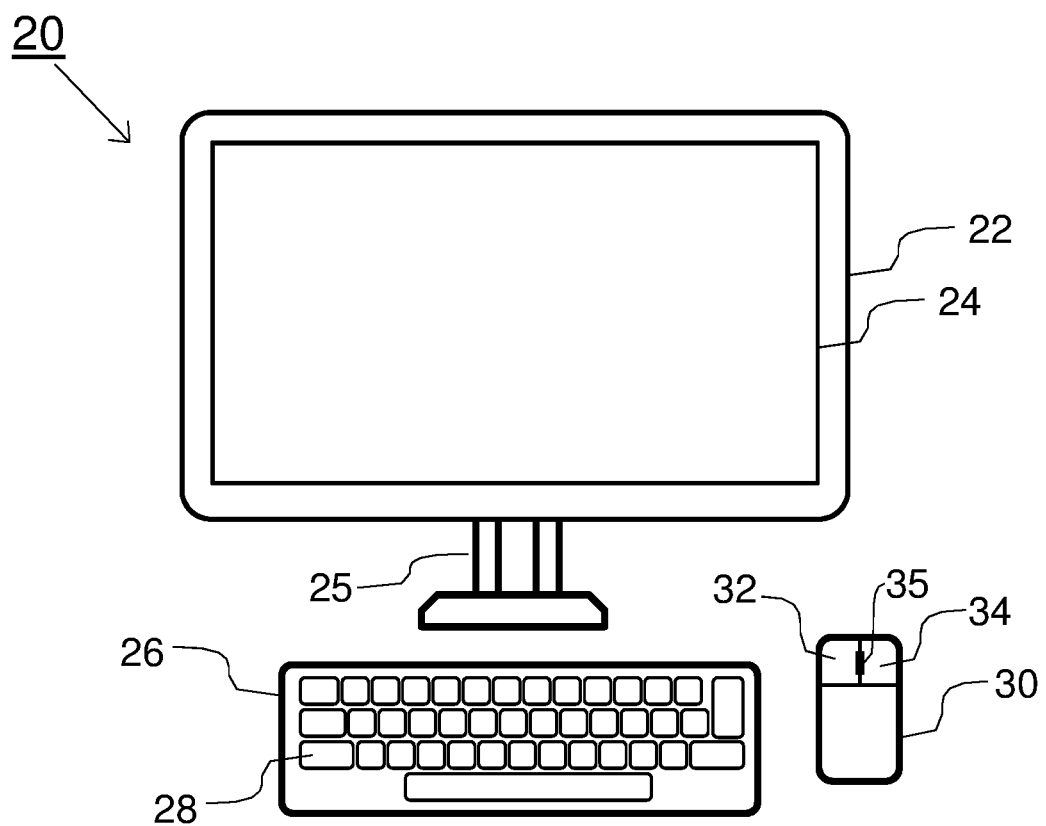
FIG. 1 shows a generic computer device on which embodiments of the disclosure may be installed and performed.

FIG. 1 shows a generic computing device 20 on which embodiments of the disclosure may be installed and performed. The computing device 20 comprises a monitor 22 housing a display 24 and having a stand 25. The computing device 20 further comprises suitable user input/output (I/O) devices with a keyboard 26 and mouse 30 being illustrated. In the case that the display 24 includes an overlaid touch sensor, then the touch sensor will constitute a further I/O device. The keyboard 26 includes a plurality of keys 28, e.g. following a standard QWERTY layout and space bar, with other standard keys such as ENTER, CAPS LOCK, ALT, CTRL, FN and so forth also being provided. The mouse 30 is illustrated as including a left button 32, a right button 34 and a scroll wheel 35. Of course, further buttons and input elements may also be included, such as in a mouse designed or configured for gaming or other specific application types.

Figure 2:
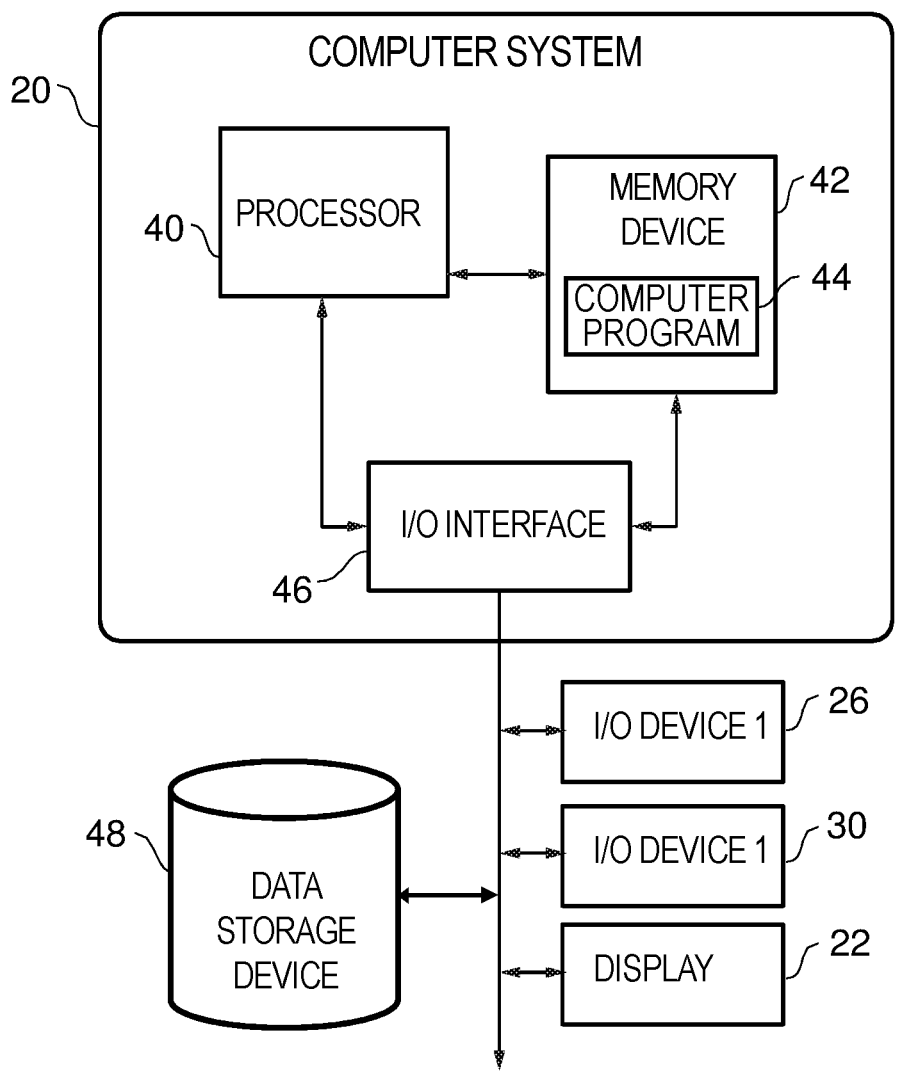
FIG. 2 shows the internal structure of the generic computer of FIG. 1.

FIG. 2 shows the internal structure of the generic computing device 20 of FIG. 1 in a block diagram. The computing device 20 comprises a processor 40 to provide a processor resource coupled through one or more I/O interfaces 46 to one or more hardware data storage devices 48 and one or more I/O devices 26, 30, which can manage graphic object requests, and the display 24 on which graphics objects can be displayed. The processor 40 may also be connected to one or more memory devices 42. At least one memory device 42 to provide a memory resource contains a stored computer program 44, which is a computer program that comprises computer-executable instructions. The data storage devices 48 may store the computer program 44. The computer program 44 stored in the storage devices 48 is configured to be executed by processor 40 via the memory devices 42. The processor 40 executes the stored computer program 44.

It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example, a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program operable to, when deployed into a computer infrastructure and executed thereon, cause the computing device to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or another device to produce a computer implemented process, such that the instructions which execute on the computer, other programmable apparatus, or other device implement the functions/acts specified in the flowchart and/or block diagram block or blocks.

Before describing the underlying logic and process flow of an example control method and computer program embodying the disclosure, we first introduce a high-level understanding of the disclosure through showing a sequence of schematic screen shots showing application windows whose configuration presentation is dictated by the control software. The screen shots give a general introduction to the kind of functionality provided by the control software.

Figure 3:
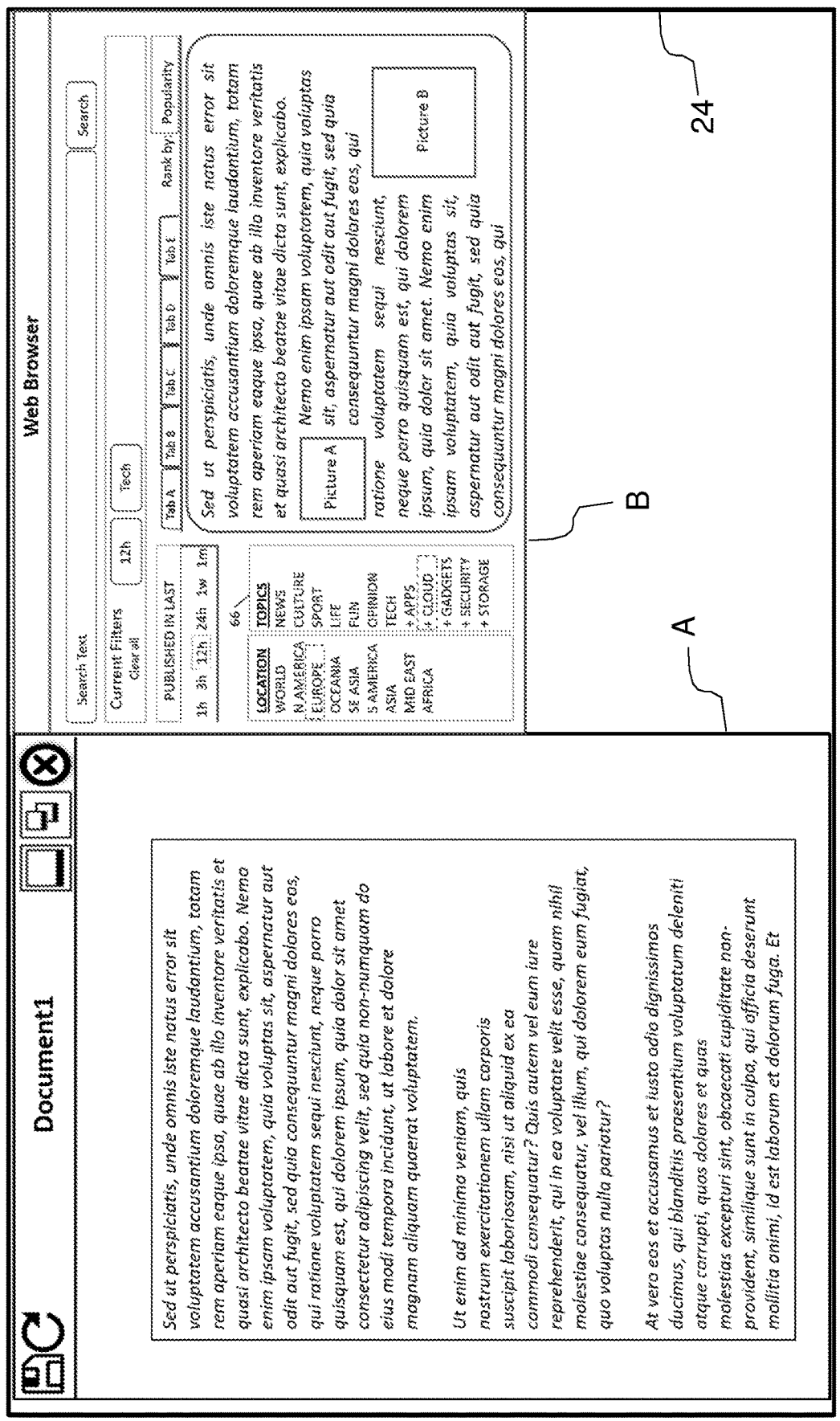
FIG. 3 is a schematic representation of a first screen shot of a display on which first and second windows relating to first and second applications are displayed side-by-side in a conventional split-screen arrangement.

FIG. 3 is a schematic representation of a first screen shot of a display 24 on which first and second windows (Window A, Window B) relating to first and second applications are displayed side-by-side in a conventional split-screen arrangement. The first application is, by way of example, a word processor, which is associated with the left-hand window with the header label "Document1". The second application is, by way of example, a web browser, which is associated with the right-hand window with the header label "Web Browser". The user is performing a copy-and-paste of text from the web page being presented by the web browser in the web browser window into the, initially empty, word processor document.

Figure 4:
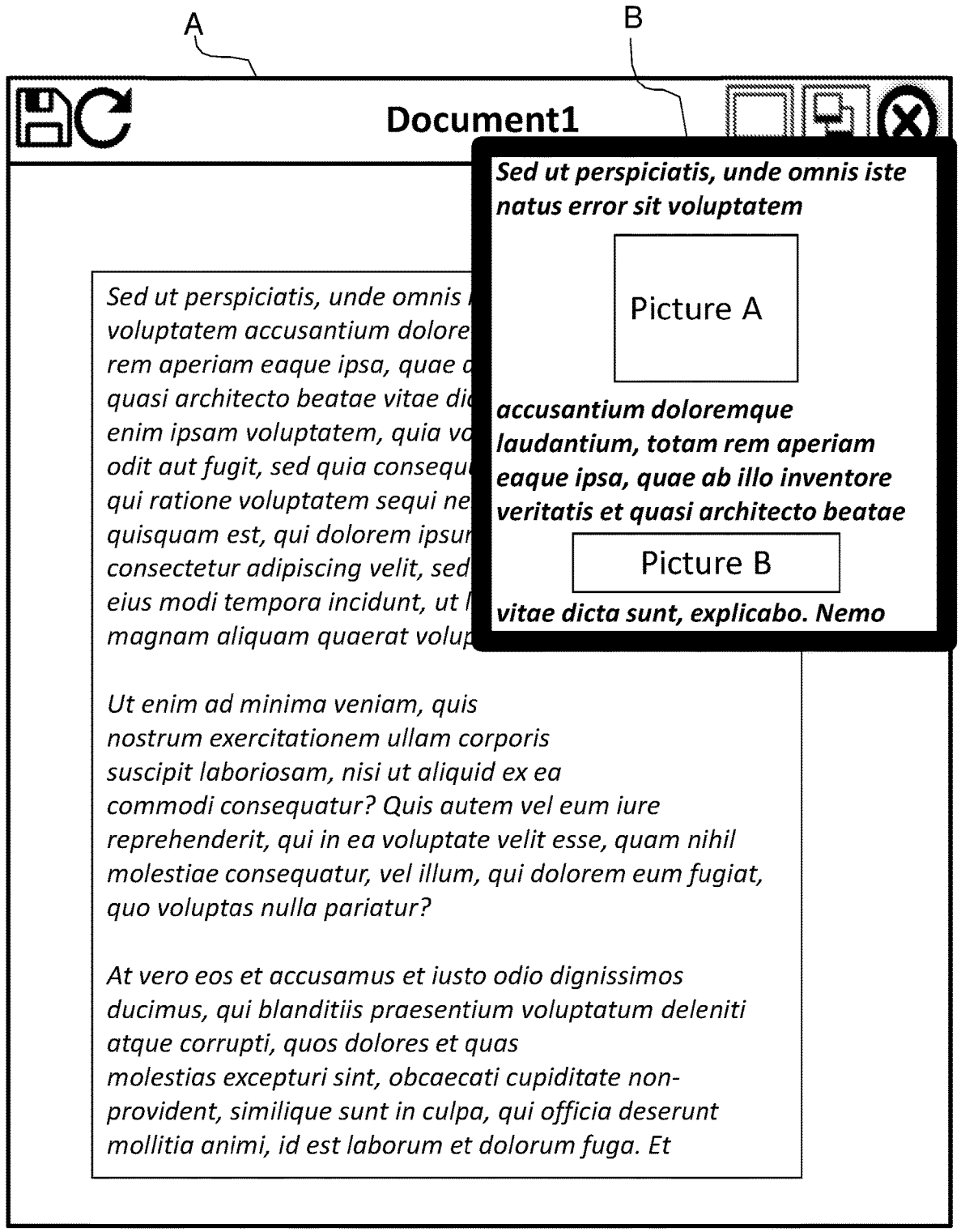
FIG. 4 is a schematic representation of a second screen shot of a display on which first and second windows relating to first and second applications are displayed according to an embodiment of the disclosure.

FIG. 4 is a schematic representation of a second screen shot of a display on which the same two applications are running as in FIG. 3; the word processor is presented in Window A and the web browser is presented in Window B. The screen shot of FIG. 4 shows a transformation of the graphical user interface (GUI) triggered by the user's repeated copy-and-paste actions from the web browser to the word processor. It is the control software according to an embodiment of the disclosure that has detected the user's repeated copy-and-paste actions and in response thereto jumped to the GUI shown in FIG. 4. The web browser window is now presented as an overlay on top of the word processor window, with the presented part of the web page being that which the control software has sensed is the portion of the web page being of most interest to the user for copy-and-paste. This kind of overlay of one application window within another application window is termed a Picture-in-Picture (PiP) window.

Figure 5:
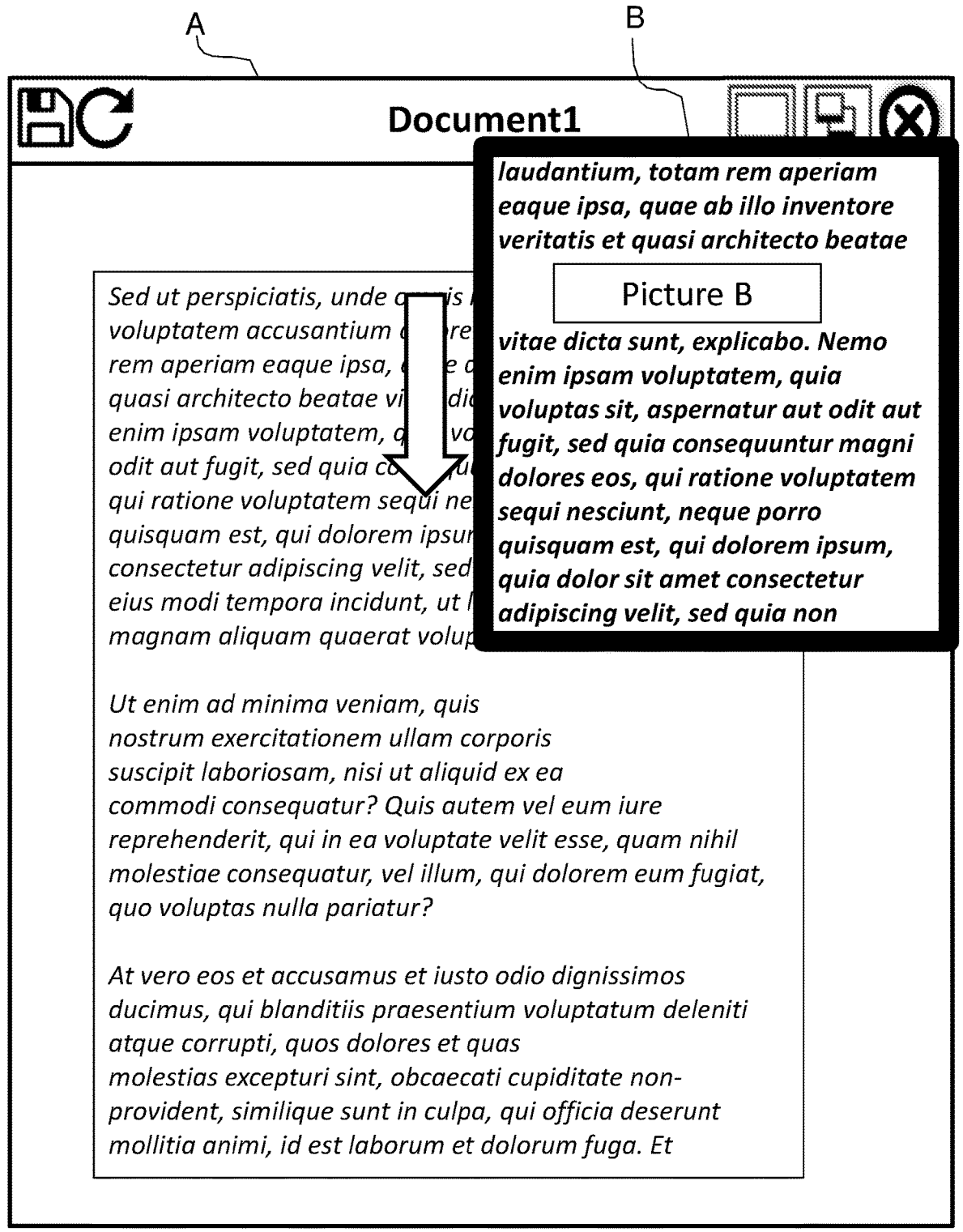
FIG. 5 is a schematic representation of a third screen shot of a display which has evolved from the situation of FIG. 4 by the user scrolling down in the window of the second application.

FIG. 5 is a schematic representation of a third screen shot of a display which has evolved from the situation of FIG. 4 by the user scrolling down in the window of the second application (Window B). The control software in the screen mode of FIG. 3 enables a user control function, e.g. by a touch gesture, key combination, or mouse gesture, whereby the user can scroll the content shown in the source application window. For a mouse gesture, this might be a right-button hold and mouse movement combination. For a touch gesture, this might be a multi-touch gesture with a first-finger hold on the window edge with a second-finger drag up or down within the window. In FIG. 5 the content has been scrolled down, as indicated by the arrow, so that Picture B is near the top of the window revealing 'new' text below compared with FIG. 4, and Picture A has scrolled off the top limit of the window.

Figure 6:
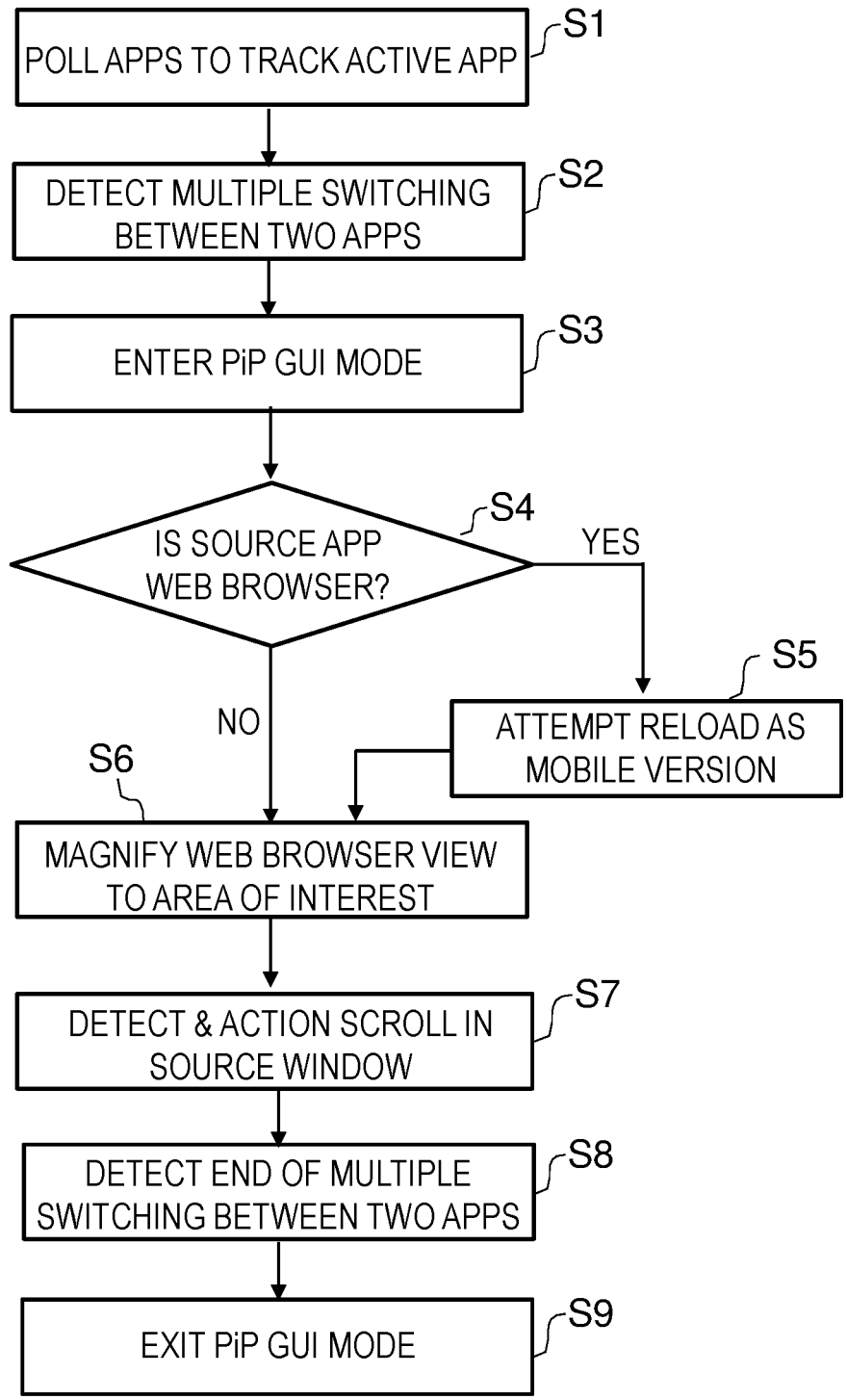
FIG. 6 is a flow diagram to describe how control according to embodiments of the disclosure is performed.

FIG. 6 is a flow diagram to describe how a control function according to embodiments of the disclosure is performed.

Step S1 indicates the quiescent state of the system in which the control software is running as a background function monitoring which apps are active, e.g. as part of the operating system, as an add-on to the operating system or as a microservice or other module. It is noted that 'active' in this context is sometimes referred to as 'in focus'. To accomplish the monitoring, the control software polls the system periodically or aperiodically, e.g. at a suitable fixed time interval of, e.g. some hundreds of milliseconds, to create a log or history of which app the user is active in over the recent past. The history may log which apps were running, which app was active at any given time and the times when the active app changed, for example. The log may also include logging of the types of user interactions with the apps, in particular, GUI interaction through, for example, mouse cursor location tracking relative to different app windows, command key sequences such as CTRL-C (copy), CTRL-V (paste), or touch gesture tracking. It may be desirable for the log only to store changes to reduce memory usage.

In Step S2, the app log is analyzed in the background by the control software to identify patterns in the user's behavior. One specific pattern of interest is a user repeatedly switching between any given pair of applications. For example, a pattern to be detected might require a certain specified number of repetitions (e.g. 2, 3 or 4) to occur within a certain time period. Detection of such repeated switching triggers further investigation of the user activity in each of the two apps, in particular, to identify a primary app, that warrants full display (e.g. the destination app), and a secondary app, that should be redisplayed in a PiP window of the primary app (e.g. the source app).

In Step S3, the PiP GUI mode is entered by the control software, e.g. with the window of a web browser (source application) being overlaid as a PiP window on the word processor window as shown in FIG. 4. Optionally, a user prompt may gate the switch into the PiP GUI mode, e.g. a pop-up may appear on the display asking the user to confirm the mode switch is desired. (Alternatively, an equivalent voice prompt could be used.) Whether such prompts are presented before switching into the PiP GUI mode may be a user configurable setting. It is noted that, to detect the switching of applications, it is preferable to use a background system process to monitor and log the active applications as described above, rather than logging particular user commands, such as window-switching shortcuts (e.g. alt+tab), so that the monitoring is not specific to particular user commands, given that users may have a variety of different options for switching between apps.

The PiP window display may be a shrunk down view of the other application as is evident by comparing Window B in FIG. 3 (full size window) and Window B in FIG. 4 (PiP window). The PiP window is preferably set to always display on top, i.e. in the foreground, so that it remains visible while the user is working in the full sized window of the other application. This can be affected by setting an 'Always On Top' property to 'true' in the PiP window.

The PiP window's position within the main window can be decided upon based on logic in the control software. For example, the PiP window position can be decided upon based on comparing the content of the clipboard with the content in the main window application window. The logic will select a PiP window position away from where the content in the clipboard is being displayed in the main window. For example, if text or a graphic object has just been pasted into the bottom area of the main window, then the PiP window can be arranged in an upper area of the main window, e.g. top-right as illustrated in FIG. 4.

As shown in Step 4 and Step 5, in the case that the app to be placed in a PiP window is a web browser, when transferring the representation of the relevant web page from a full window to a PiP window, i.e. the transition is shown from FIG. 3 to FIG. 4, a useful feature is to re-load the web page with its mobile version, since the mobile version will have been specifically designed to provide better viewing in a smaller window. The re-load can be implemented by sending the request as if the computing device were a mobile device by modifying the web browser's user agent. Of course, not all websites have a mobile version, so the re-load is in practice an attempted re-load.

As shown in Step 6 and Step 7, the PiP window's content can be navigated with GUI commands enabled for that purpose when the system switches to the PiP GUI mode. For example, content in the PiP window can be scrolled by a mouse combination of right-click+mouse movement. A downwards scroll is illustrated by way of example by the transition from FIG. 4 to FIG. 5. Another example for a touch screen would be to enable a two-finger pinch or expansion gesture within the PiP window area of the screen to zoom in (magnify) or zoom out (demagnify) the content, as well as a one finger drag to move the center of the content, and also a single finger sweep gesture up or down for scrolling. Actions on the PiP window such as zoom in/out may also be carried out by applying the logic of contextual relevance so that for example a zoom is centered on content that has most recently been worked on by the user.

In Step S8, if the monitoring shows that no app switching has taken place for a certain period of time, then it can be inferred that the PiP GUI mode is no longer useful.

In Step S9, the PiP GUI mode can then be exited. The exit can revert to the previous window display configuration (i.e. the configuration that existed prior to Step S3), such as a split-screen mode shown in FIG. 3. Alternatively, when exiting the PiP GUI mode, the display can be switched to present one of the Windows A and B in full screen mode based on which of these two windows the user has been active in in the immediate past, as can be deduced from the app log, which stores the history of which apps are the active (in-focus) app at which time.

Example pseudo-code describing how monitoring could determine whether a PiP GUI mode would be useful given the current context of the user's actions is as follows:

Poll the apps at a certain rate, e.g. 100 ms Store active app changes (e.g. app name and timestamp)

Has user switched between two apps more than, e.g., 3 times within, e.g., 3 minutes?

Is user active in both windows (e.g. based on keyboard & mouse activity)?

What is type of activity?

If repeated copy-and-paste actions are detected then PiP window is set to be the one associated with greater number of copy keystrokes/commands Of the two applications linked in the PiP GUI mode, and absent recent repeat copy-and-paste actions, make the PiP window the one in which less time has been spent in the immediate past period. For example, after a repeated copy-and-paste which has resulted in the web browser being presented in the PiP window of a word processor, if the user then spends several minutes looking and scrolling content in the PiP window, then the control software will swap the windows, with the web browser then becoming the main window and the word processor the PiP window.

Is the PiP window being displayed a web browser?

If yes, attempt to re-load the website's mobile view either automatically, or following a user prompt for permission to do so (alternatively, e.g. if no mobile site available, magnify a portion of the website deduced to be relevant based on recent user activity)

A copy-and-paste is but one example of a user interaction with two apps that might cause switching back and forth between respective application windows. Another example would be when the user is adding content to a target application based on content in a source application, but without using copy-and-paste. For example, text content may be embedded in a graphics object in the source application which it is not possible to copy out, so the user instead views the source application and then switches to the target application and manually enters the text. Another example would be when a user has loaded a published article, e.g. from a scientific journal, into the source application and wishes to write something in the target application based on what is said in the scientific article. That is, the user is authoring a new article in the target application and writing a summary of, or comment on, something that is disclosed in the published article loaded in the source application.

As discussed immediately above, the second (source) application displayed in the PiP window may be a web browser. Another example for the second application to be displayed in the PiP window would be a chat or instant message application.

In summary of the above described embodiments, the control software monitors the user's behavior to keep track of the currently active application, where the term currently active application refers to the application which the user is currently interacting with in the user interface. The control software keeps an active application history which allows it to detect when the user is switching back-and-forth between two applications. A repeated switching back-and-forth within a certain time frame can then trigger the control software, optionally based on further checks of recent user actions (e.g. a check of whether copy-and-paste functions are associated with the application switching), to switch to a PiP GUI mode in which the source application is presented in a PiP window within the destination application window. The destination app window may occupy the full screen or other significant portion thereof, such as the left half or the right half. Further functionalities to support the user copy-and-paste actions can also be enabled in the PiP GUI mode.

The PiP GUI mode is thus entered into by the control software in an automated process without the user needing to manually reconfigure any of the windows. The PiP GUI mode aids a user in performing repetitive tasks involving the source and destination applications (such as copy-and-pasting between the applications). Moreover, if the display is low resolution (e.g. a projector plugged in using an old-style DE-15 VGA connector) or relatively small (e.g. a smart phone), a conventional side-by-side (or top-and-bottom) viewing option for the source and destination windows may not be viable. The proposed PiP GUI mode can thus facilitate copy-and-paste between applications without having to resort to switching the display between one application and the other using shortcuts.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
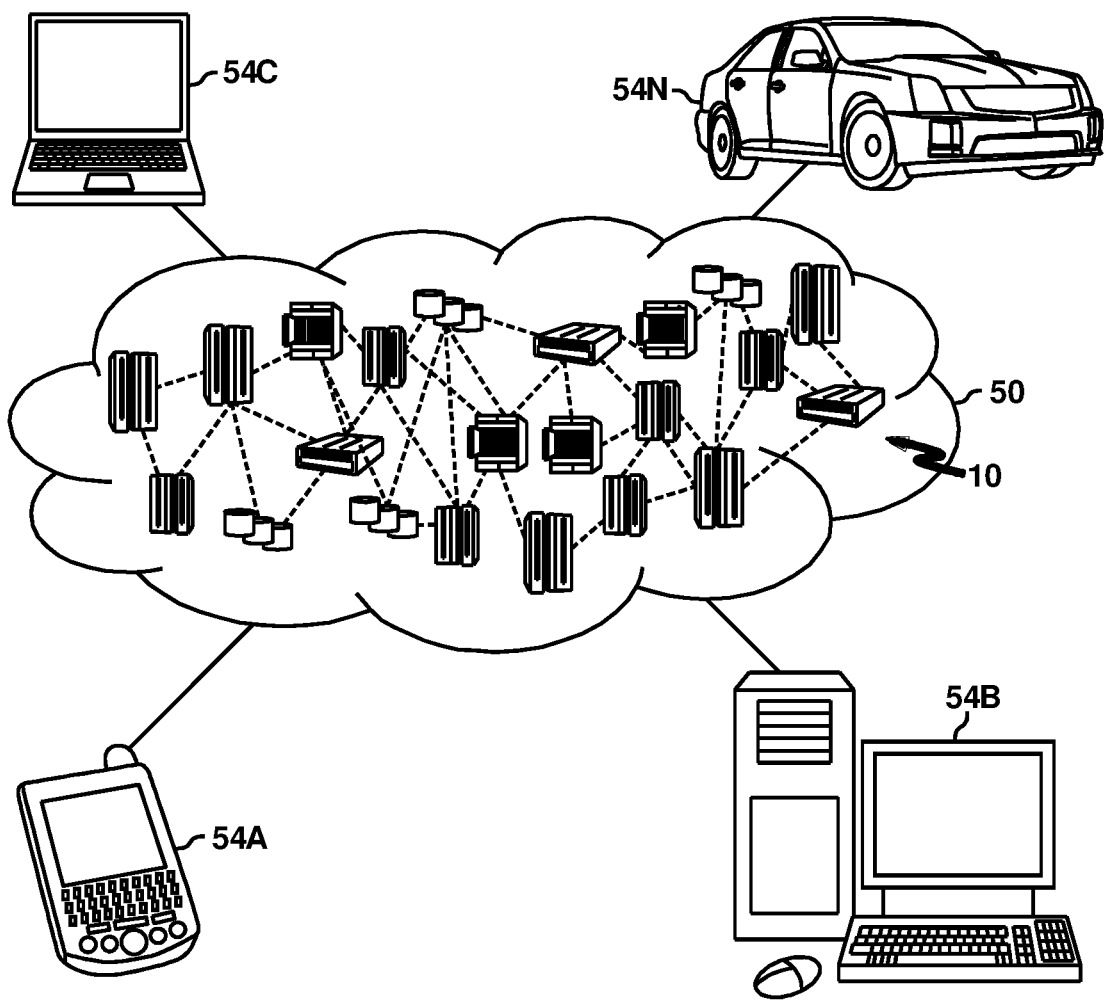
FIG. 7 depicts a cloud computing environment according to an embodiment of the present disclosure.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
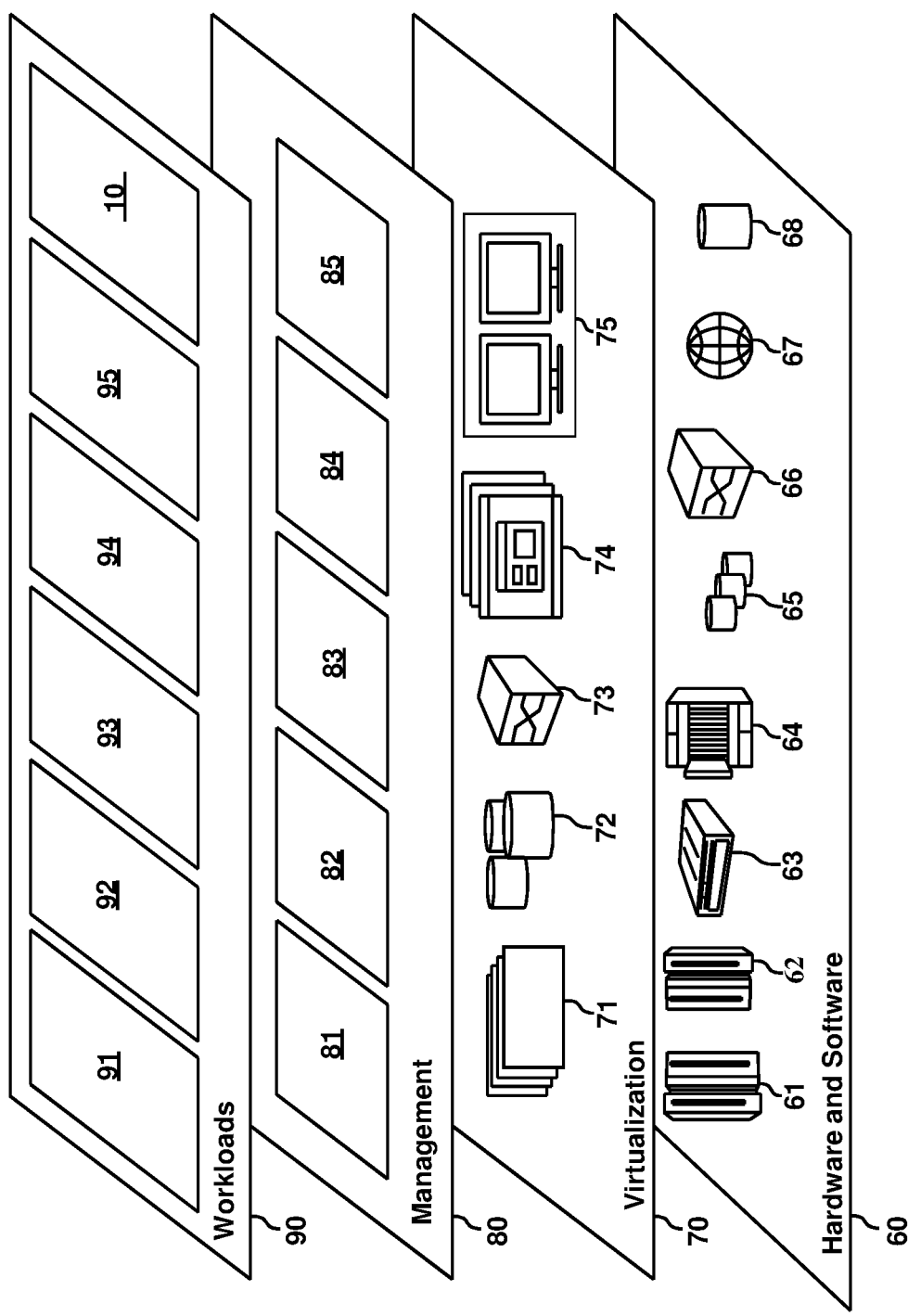
FIG. 8 depicts abstraction model layers according to an embodiment of the present disclosure.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the disclosure are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software lifecycle management 92; virtual classroom education delivery 93; data analytics processing 94; transaction processing 95; and software development cycle management 96 according to embodiments of the disclosure.

It will be clear to one skilled in the art that many improvements and modifications can be made to the foregoing exemplary embodiment without departing from the scope of the present disclosure.

What is claimed is:

1. A computer-automated method for controlling display of application windows on a screen of a computing device, the method comprising:

monitoring and recording, in a log, aspects of a user's interaction with first and second applications running on the computing device and respectively associated with first and second windows on the screen, wherein the log includes an active application history;

analyzing the log to detect a pattern in the user's interaction with the first and second applications, wherein the pattern is switching between the first application and the second application as active applications more than a threshold number of times during a particular time period;

based on detecting the pattern, displaying a prompt to the user asking the user whether the user desires to reconfigure the screen;

reconfiguring the screen to present the second window within the first window as a picture-in-picture window responsive to a response to the prompt, wherein reconfiguring the screen comprises enabling at least one user interface command specific to the second window while it is presented as a picture-in-picture window on top of the first window; and based on detecting that an amount of time spent by the user in the second window is greater than a threshold time, reconfiguring the screen to present the first window within the second window as the picture-in-picture window.

2. The method of claim 1, wherein the second window is presented as being on top of the first window.

3. The method of claim 1, wherein the pattern to be detected further includes at least one of the switchings being associated with copying of content from the second application into the first application.

4. The method of claim 3, wherein reconfiguring the screen comprises positioning the second window within the first window having regard to where content has been pasted into the first window, so that the second window is not on top of an area of the first window in which the content is displayed.

5. The method of claim 1, wherein the pattern to be detected further includes at least one of the switchings being associated with viewing content in the second application, as sensed by presence of that content in the second window, and then entering through a user interface further content into the first window of the first application.

6. The method of claim 1, wherein, when the second application is a web browser and the second window a webpage, reconfiguring the screen comprises attempting to reload the webpage as a mobile version of the webpage for the second window.

7. A computing device having a computer program for automatically controlling display of application windows on a screen of the computing device, the computing device comprising:

the screen;

the computer program for a background process;

a memory on which the computer program is loaded; and a processor for executing the computer program loaded in the memory so as to run the computer program to:

monitor and record, in a log, aspects of a user's interaction with first and second applications running on the computing device respectively associated with first and second windows on the screen, wherein the log includes an active application history;

analyze the log to detect a pattern in the user's interaction with the first and second applications, wherein the pattern is switching between the first application and the second application as active applications more than a threshold number of times during a particular time period;

based on detecting the pattern, display a prompt to the user asking the user whether the user desires to reconfigure the screen;

reconfigure the screen to present the second window within the first window as a picture-in-picture window responsive to a response to the prompt, wherein reconfiguring the screen comprises enabling at least one user interface command specific to the second window while it is presented as a picture-in-picture window on top of the first window; and based on detecting that an amount of time spent by the user in the second window is greater than a threshold time, reconfiguring the screen to present the first window within the second window as the picture-in-picture window.

8. The device of claim 7, wherein the second window is presented as being on top of the first window.

9. The device of claim 7, wherein the pattern to be detected further includes at least one of the switchings being associated with copying of content from the second application into the first application.

10. The device of claim 7, wherein the pattern to be detected further includes at least one of the switchings being associated with viewing content in the second application, as sensed by presence of that content in the second window, and then entering through a user interface further content into the first window of the first application.

11. The device of claim 7, wherein, when the second application is a web browser and the second window a webpage, reconfiguring the screen comprises attempting to reload the webpage as a mobile version of the webpage for the second window.

12. A computer program product for automatically controlling display of application windows on a screen of a computing device, the computer program product comprising:

a computer-readable storage medium having computer-readable program code embodied therewith, the computer-readable program code comprising:

computer-readable program code configured for:

monitoring and recording, in a log, aspects of a user's interaction with first and second applications running on the computing device and respectively associated with first and second windows on the screen, wherein the log includes an active application history;

analyzing the log to detect a pattern in the user's interaction with the first and second applications, wherein the pattern is switching between the first application and the second application as active applications more than a threshold number of times during a particular time period;

based on detecting the pattern, displaying a prompt to the user asking the user whether the user desires to reconfigure the screen;

reconfiguring the screen to present the second window within the first window as a picture-in-picture window responsive to a response to the prompt, wherein reconfiguring the screen comprises enabling at least one user interface command specific to the second window while it is presented as a picture-in-picture window on top of the first window; and based on detecting that an amount of time spent by the user in the second window is greater than a threshold time, reconfiguring the screen to present the first window within the second window as the picture-in-picture window.

13. The computer program product of claim 12, wherein the second window is presented as being on top of the first window.

* * * * *